(12) United States Patent
Igarashi

(10) Patent No.: US 9,497,537 B2
(45) Date of Patent: Nov. 15, 2016

(54) CONFERENCE APPARATUS

(71) Applicant: Kiyoto Igarashi, Kanagawa (JP)

(72) Inventor: Kiyoto Igarashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/627,364

(22) Filed: Feb. 20, 2015

(65) Prior Publication Data

US 2015/0244985 A1   Aug. 27, 2015

(30) Foreign Application Priority Data

Feb. 27, 2014  (JP) .................................. 2014-037466
Dec. 12, 2014  (JP) .................................. 2014-251849

(51) Int. Cl.
*H04N 7/14*   (2006.01)
*H04R 1/32*   (2006.01)
*H04R 27/00*  (2006.01)
*H04N 101/00* (2006.01)

(52) U.S. Cl.
CPC .............. *H04R 1/326* (2013.01); *H04N 7/147* (2013.01); *H04R 27/00* (2013.01); *H04N 2101/00* (2013.01); *H04R 2201/401* (2013.01); *H04R 2430/23* (2013.01)

(58) Field of Classification Search
CPC ........................................................ H04N 7/14
USPC ................................ 348/14.01, 14.08, 14.12
See application file for complete search history.

(56) References Cited

U.S. PATENT DOCUMENTS

| 2012/0056973 A1* | 3/2012 | Yano ....................... G03B 17/54 |
| | | 348/14.08 |
| 2013/0107028 A1* | 5/2013 | Glei ner ................... H04R 3/00 |
| | | 348/77 |
| 2013/0242207 A1* | 9/2013 | Hiramatsu ........... H04N 5/7475 |
| | | 348/789 |

FOREIGN PATENT DOCUMENTS

| JP | 11-018192 A | 1/1999 |
| JP | 2006-332736 A | 12/2006 |
| JP | 2012-054813 A | 3/2012 |
| JP | 2013-219745 A | 10/2013 |

* cited by examiner

*Primary Examiner* — Olisa Anwah
(74) *Attorney, Agent, or Firm* — Oblon, McClelland, Maier & Neustadt, L.L.P.

(57) ABSTRACT

Provided is a conference apparatus, which includes a capturing unit to capture an image, a use environment detection unit to detect a use environment in which the conference apparatus is used, and a sound collecting unit whose directivity are changed according to the use environment detected by the use environment detection unit.

20 Claims, 15 Drawing Sheets

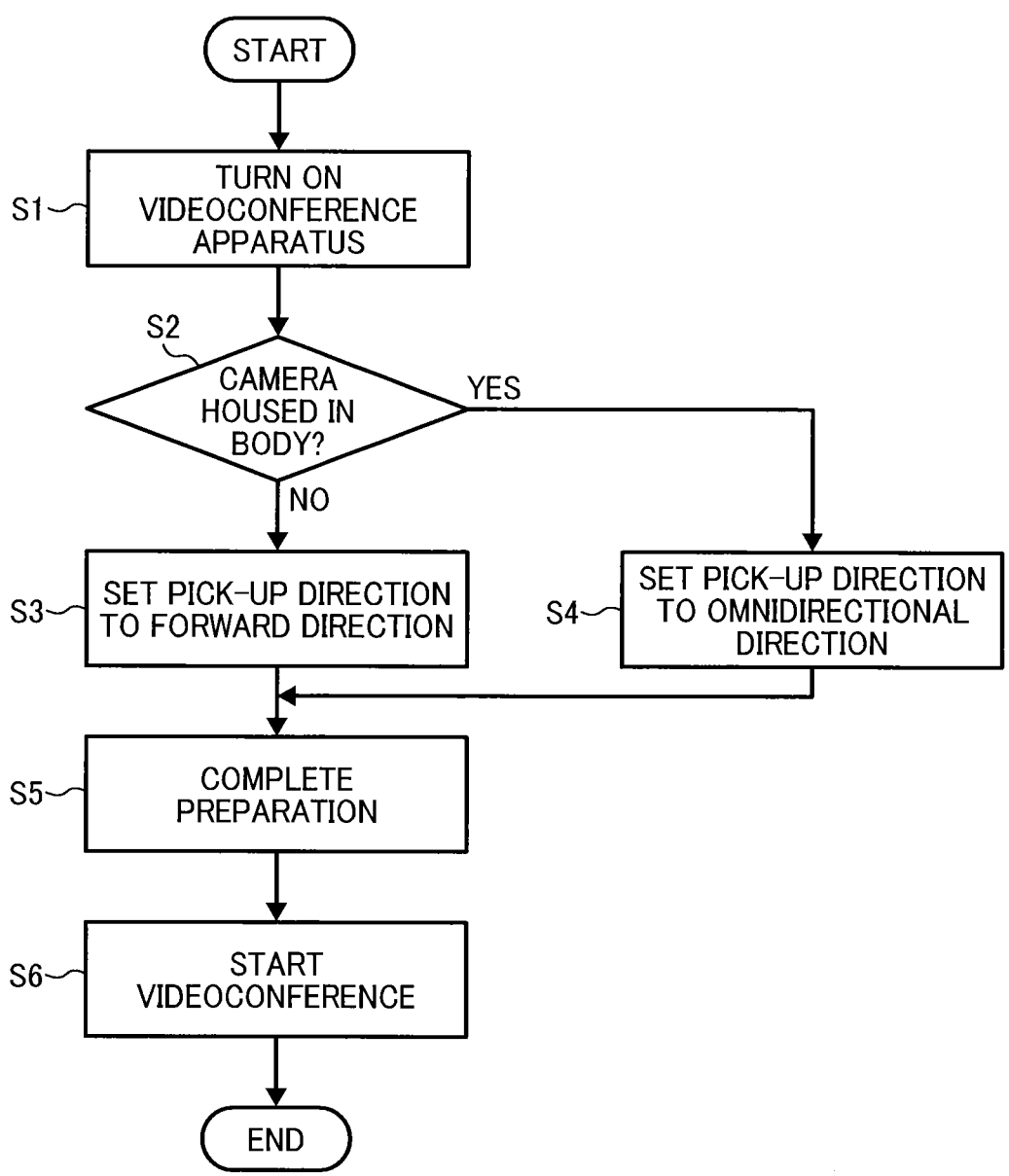

ably arranged at the front edge of a conference table. In
CONFERENCE APPARATUS

CROSS-REFERENCE TO RELATED APPLICATIONS

This patent application is based on and claims priority pursuant to 35 U.S.C. §119(a) to Japanese Patent Application Nos. 2014-37466, filed on Feb. 27, 2014, and 2014-251849, filed on Dec. 12, 2014, in the Japan Patent Office, the entire disclosure of which are hereby incorporated by reference herein.

BACKGROUND

Technical Field

The present invention relates to a conference apparatus, and more particularly, to a conference apparatus having at least one microphone whose directivity varies.

Description of the Related Art

In the related art, known is a portable conference apparatus capable of changing directivity that is a sound collection range of a microphone built in a body thereof according to a use scene.

Since the entire conference participants need to be photographed by a camera, the portable conference apparatus is generally arranged at the front edge of a conference table. In this case, unnecessary sound such as noise of a fan of a video display or sound leaking from near rooms in the direction where speaking persons are not present may be collected.

By controlling the directivity of the microphone by using microphone array technique so as not to collect such unnecessary sound as much as possible, a quality of the sound heard by the counterparty in the conference is able to be improved.

For example, a microphone having a unidirectional directivity such as a microphone having only a forward directivity is installed, so that the aforementioned unnecessary sound is not allowed to be collected.

SUMMARY

According to an aspect of the present invention, there is provided a conference apparatus, which includes a capturing unit to capture an image, a use environment detection unit to detect a use environment in which the conference apparatus is used, and a sound collecting unit whose directivity are changed according to the use environment detected by the use environment detection unit.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a flowchart illustrating operation performed by the conference apparatus according to the first embodiment of the present invention;

Figure 1A:
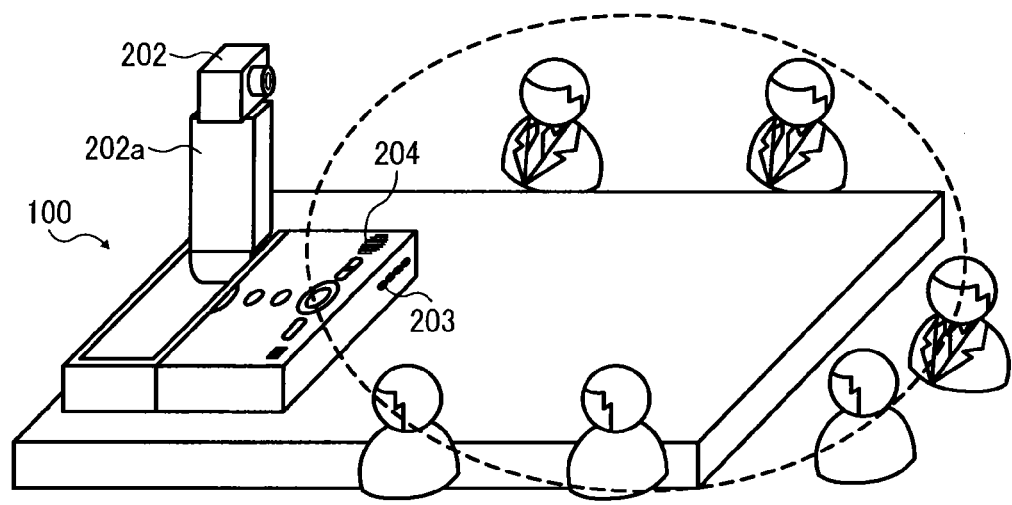
FIGS. 1A and 1B are illustration for explaining operations of a conference apparatus according to a first embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

<Configuration of First Embodiment>

Figure 2:
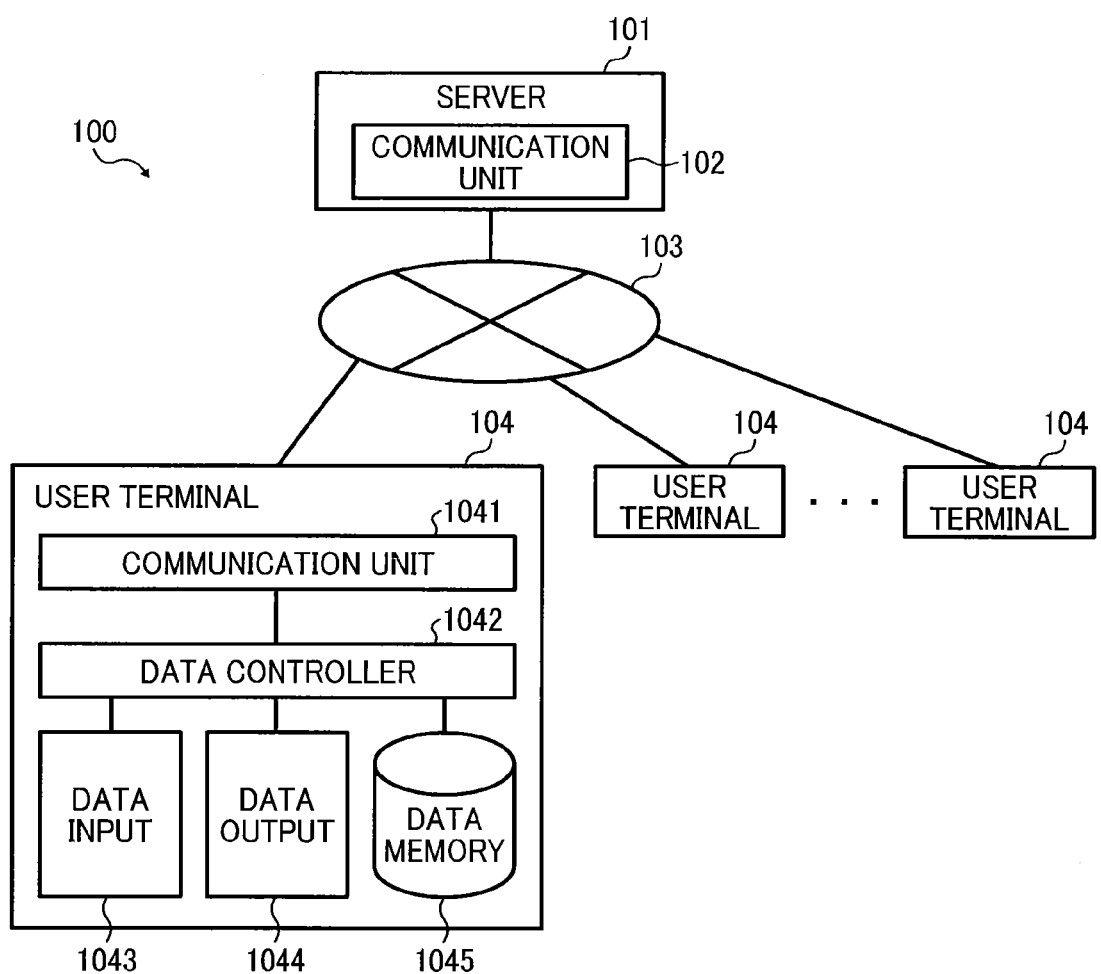
FIG. 2 is a block diagram illustrating a configuration of a videoconference system including the conference apparatus according to the first embodiment of the present invention.

As illustrated in FIG. 2, a videoconference system 100 includes a plurality of user terminals 104, which are connected with one another via a communication network 103, to communicate video information and sound information of users acquired by the user terminals to carryout videoconference.

The communication network 103 is connected to a server 101 including a communication unit 102. The user terminal 104 includes a communication unit 1041, a data controller 1042, a data input 1043, a data output 1044, a data memory 1045, and the like. In this example, the user terminal 104 is implemented by a conference apparatus, which is described below.

Figure 3:
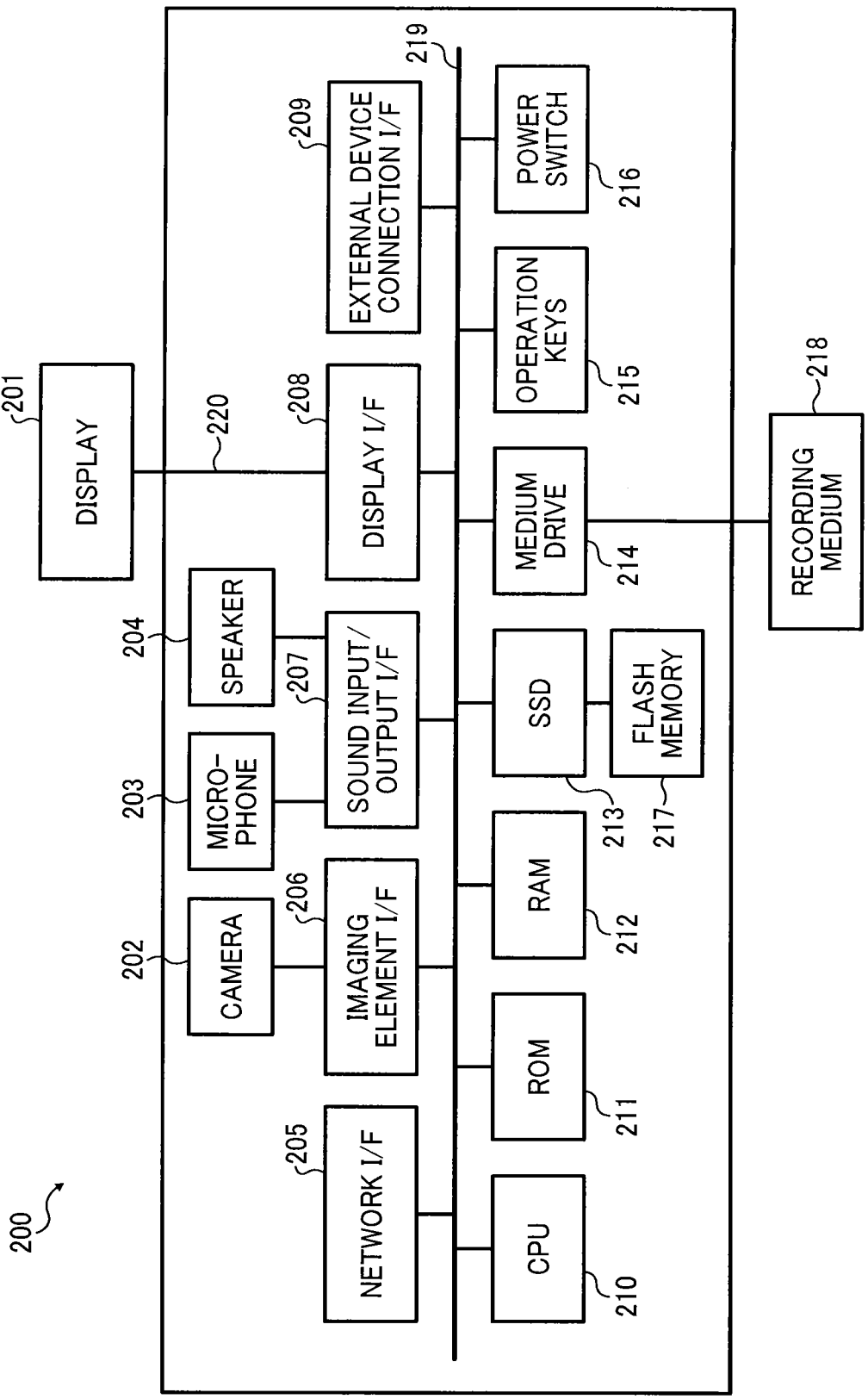
FIG. 3 is a block diagram illustrating a configuration of the conference apparatus according to the first embodiment of the present invention.

A configuration of the conference apparatus 200 is described with reference to FIG. 3. As illustrated in FIG. 3, the conference apparatus 200 includes a central processing unit (CPU) 210 which controls overall operations. Programs such as an initial program loader (IPL) or the like used for driving the CPU 210 are recorded in a read only memory (ROM) 211.

A random access memory (RAM) 212 is used as a work area for the CPU 210, and programs for terminal and various data such as image data and sound data are recorded in a flash memory 217. A solid state drive (SSD) 213 controls reading or writing of various data in or from the flash memory 217 under control of the CPU 210. A medium drive 214 controls reading or writing of data in or from a recording medium 218 such as a flash memory.

Besides, operation keys 215 manipulated, for example, in the case of selecting a destination, a power switch 216 for switching power on/off, and a network I/F 205 for transmitting data by using a communication network are included.

In addition, the conference apparatus 200 includes a built-in camera 202 which obtains image data by photographing a subject under control of the CPU 210 and an imaging element I/F 206 which controls driving of the camera 202. The camera 202 functions as an image capturing unit such as a photographing unit.

As a sound system, the conference apparatus 200 includes a built-in microphone 203 which inputs sound, a built-in speaker 204 which outputs sound, and a sound input/output I/F 207 which processes input and output of a sound signal between the microphone 203 and the speaker 204 under control of the CPU 210. The microphone 203 functions as a sound collecting unit, and in case of having directivity, sound in a direction where the directivity is set is enhanced.

The conference system 200 further includes a display I/F 208 which transmits image data to an externally-attached display 201 under control of the CPU 210 and an external device connection I/F 209 for connecting various external devices. The above-described components are electrically connected by a bus line 219 such as an address bus or a data bus.

The display 201 may be implemented by a liquid crystal display or an organic EL display where an image of the subject or manipulation icons is displayed. In addition, the display 201 is connected to the display I/F 208 by a cable 220. The cable 220 may be a cable for analog RGB signals, namely, VGA signals.

In addition, the above-described cable may be a cable for component video or a cable for a high-definition multimedia interface (HDMI, registered trade mark) signal or a digital video interactive (DVI) signal.

The camera 202 includes lenses or a solid imaging element which converts light into electric charges to generate electrical signals of the image and video of the subject. For example, a complementary metal oxide semiconductor (CMOS), a charge coupled device (CCD), or the like is used.

External devices such as an externally-attached camera, an externally-attached microphone, and an externally-attached speaker are connectable to the external device connection I/F 209 by using a universal serial bus (USB) cable or the like.

In a case where the externally-attached camera is connected, the externally-attached camera is driven in preference to the built-in camera 202 according to the control of the CPU 210. Similarly, in a case where the externally-attached microphone is connected or in a case where the externally-attached speaker is connected, the externally-attached microphone or the externally-attached speaker is driven in preference to the built-in microphone 203 or the built-in speaker 204 according to the control of the CPU 210.

In addition, the recording medium 218 is configured to be detachable with respect to the conference apparatus 200. In addition, if an electrically erasable and programmable ROM (EEPROM) or the like is a nonvolatile memory which performs reading or writing data under control of the CPU 210, the EPROM or the like may be used as the flash memory 217.

In addition, the above-described program for terminal may be recorded in an installable format file or an executable format file in a computer-readable recording medium such as the above-described recording medium 218, and the recording medium may be distributed. In addition, the program for terminal may be recorded in the ROM 211 instead of the flash memory 217.

Figure 4A:
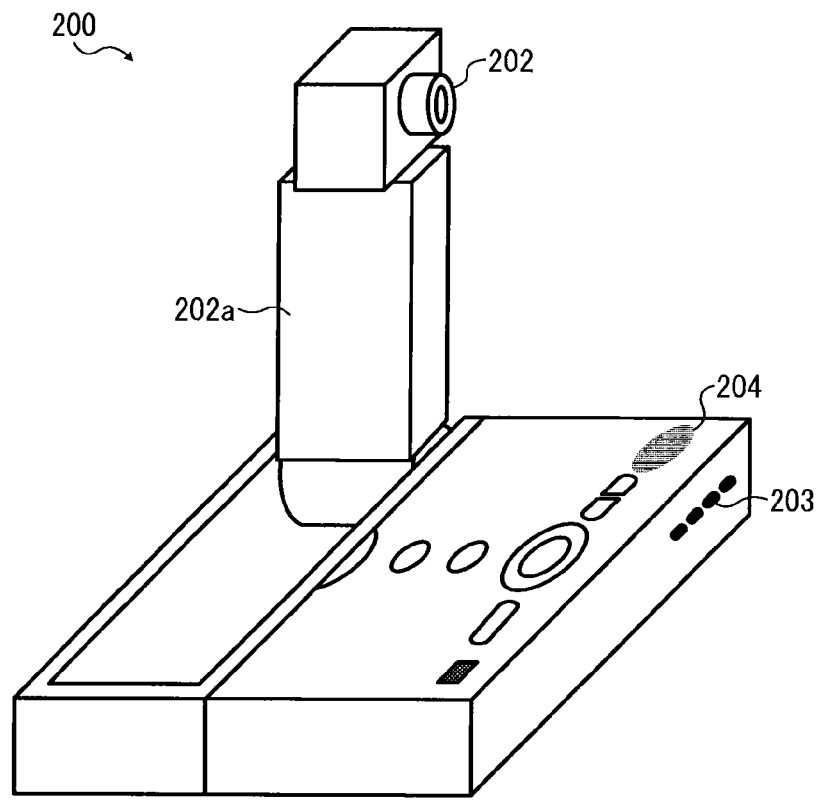
FIGS. 4A and 4B are perspective views illustrating a configuration of the conference apparatus according to the first embodiment of the present invention.
Figure 4B:
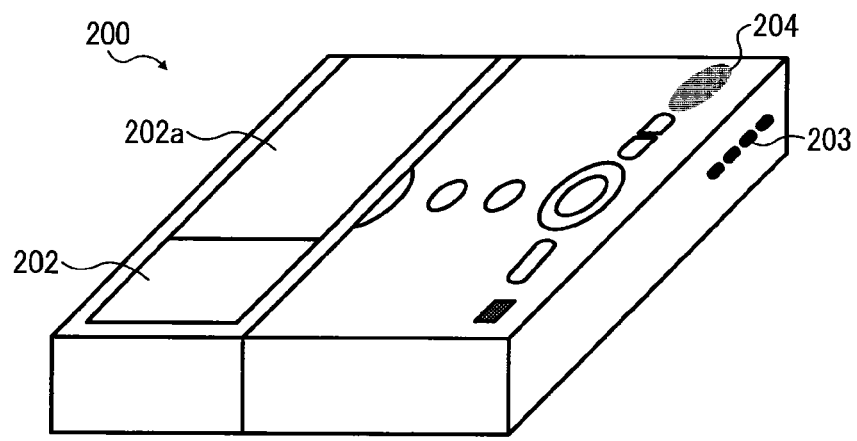

FIGS. 4A and 4B are perspective diagrams illustrating the conference apparatus 200. As illustrated in FIG. 4A, the camera 202 is installed at a distal end of an arm 202a, and the arm 202a is installed in a body of the conference apparatus. In addition, as illustrated in FIG. 4B, the camera 202 is able to be housed in the body by folding the arm 202a. The state illustrated in FIG. 4A is a photographable (capturing) state, and the state illustrated in FIG. 4B is an unphotographable (non-capturing) state.

Figure 5A:
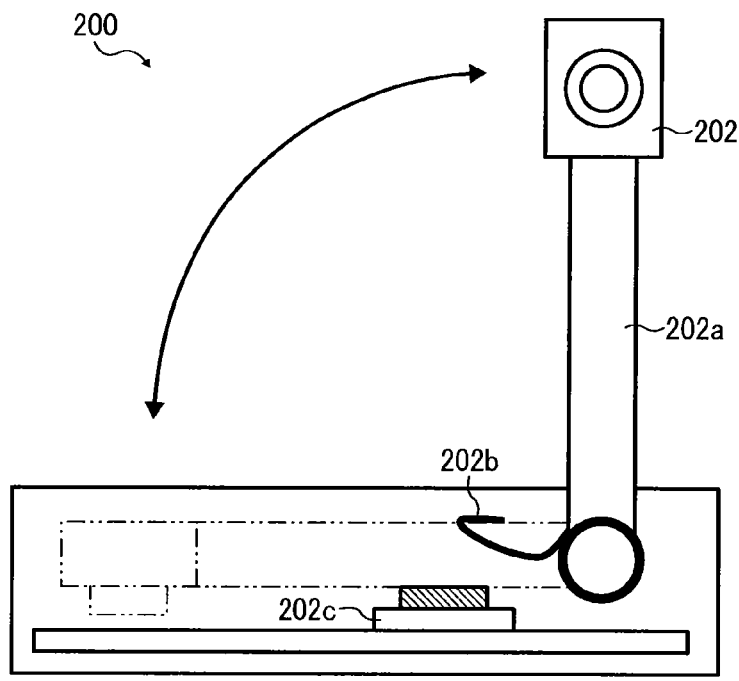
FIGS. 5A and 5B are front views illustrating a configuration of the conference apparatus according to the first embodiment of the present invention.
Figure 5B:
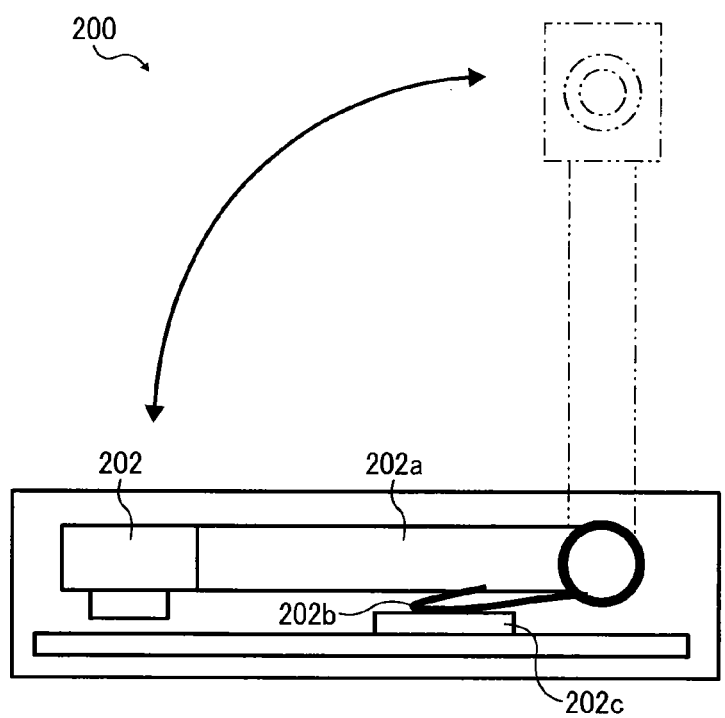

FIGS. 5A and 5B are front diagrams illustrating the conference apparatus 200. As illustrated in FIG. 5A, an elastic member 202b and a camera housing sensor 202c of a switch are installed inside the conference apparatus 200. In this case, the camera housing sensor 202c functions as a use environment detection unit.

As illustrated in FIG. 5A, when the camera 202 is not housed, the camera housing sensor 202c is not pressed down and, thus, it is recognized that the arm 202a is erected, so that the state where the camera 202 is not housed is sensed.

In addition, as illustrated in FIG. 5B, when the camera 202 is housed, the camera housing sensor 202c is pressed down by the elastic member 202b, and thus, it is recognized that the arm 202a is folded, so that the state where the camera 202 is housed is sensed.

Although the method of pressing the switch by using the elastic member is employed as a unit for sensing the housing of the camera 202, if it is possible to be sensed that the arm 202a is folded or the camera 202 is housed, an optical sensor or a proximity sensor may be used. As described later, the conference apparatus according to the embodiment is able to change the directivity of the microphone according to a scene. For example, in a case where the counterparty in the conference uses the conference system for only the sound or in a case where a network band is so narrow that a video image is not able to be transmitted, since there is no need to photograph participants by using a camera, the camera is housed. In this case, the conference apparatus is arranged at the center of a conference table, and an omnidirectional microphone is used, so that it is possible to more clearly collect sound of the entire participants of the conference.

On the contrary, if the conference apparatus is arranged at the front edge of the conference table in the state where the directivity of the microphone is set to be omnidirectional, since even unnecessary sound in the direction where there is no speaking person is also actively collected, the quality of sound heard by the counterparty in the conference is deteriorated, and thus, in some cases, there occurs a problem in conversation.

It is understood from this that it is preferable to use the microphone having a directivity according to a scene. However, the directivity of the microphone is not able to be changed by merely using only the unidirectional directivity of the microphone. Therefore, as illustrated later, the conference apparatus according to the embodiment changes the directivity for collecting sound according to the detected use environment.

<Operation of First Embodiment>

Operations of the conference apparatus 200 are described with reference to FIGS. 1A, 1B, and 6. First, as illustrated in FIG. 6, the camera 202 is powered on (step S1). Next, it is sensed by the camera housing sensor 202c whether the camera 202 is housed in the body (step S2).

In a case where it is sensed that the camera 202 is not housed in the body (No in step S2), the directivity of the microphone 203 is set to forward directivity. FIG. 1A illustrates the state where the directivity of the microphone 203 is set to the forward directivity suitable for collecting sound in the forward direction. In this case, it is assumed that the conference apparatus 200 is installed at the edge of the table and conference participants are present in front of the conference apparatus 200, and sound in the range surrounded by a broken line is collected. In addition, herein, the term "front" denotes the direction where the camera 202 photographs.

In a case where it is sensed that the camera 202 is housed in the body (Yes in step S2), the directivity of the microphone 203 is set to be omnidirectional, and the microphone is in the state of having an omnidirectional directivity. FIG. 1B illustrates the state where the directivity of the microphone 203 is set to the forward directivity suitable for collecting sound in the forward direction. In this case, it is assumed that the conference apparatus 200 is installed at the center of the table and conference participant are present so as to surround the conference apparatus 200, and sound in the range surrounded by a broken line is collected. In this case, the sound collecting range is the same as that of a case where the directivity is not controlled.

After that, as illustrated in FIG. 6, if the setting of the directivity is ended, the preparation of the conference starting is completed (step S5), and the conference is started (step S6).

In this example, the control of the directivity of the microphone 203 is performed by a microphone array technique. The microphone array technique is a technique of estimating sound wave signals at the positions on the same plane by a wave equation of the sound waves having reached a plurality of microphones from a sound source. By using this, sound in a collecting range is able to be enhanced, so that it is possible to implement a sound collecting device having a directivity.

For example, the microphone array technique described in Japanese Patent Application Publication No. H11-018192-A may be applied to control a directivity.

As an example of technique to collect target sound such as voice, the target sound may be extracted by processing an output signal that is output from a plurality of microphones (microphone array). Examples of signal processing used for extracting the target sound while suppressing noise, with the microphone array, include delay-and-sum technique and AMNOR technique. For example, the target sound is extracted using delay-and-sum technique as follows.

It is assumed that "M" microphones are arranged in line at equal pitch "d", and the sound wave s(t) reaches the microphones with an angle θ. In such case, the distance that the sound wave that has reached one microphone travels before reaching an adjacent microphone is expressed as d sin θ, with d denoting a distance between adjacent microphones. Similarly, the distance that the sound wave reaches the i-th microphone (i=2, . . . , M) is expressed as (i−1)d sin θ. Accordingly, delay time Ti for the sound wave to reach the microphone 2i (i=2, . . . , M) is obtained by dividing the distance (i−1)dsin θ by the sound speed c. The sound signal from each i-th microphone, which is denoted as Xi(t), is the sound signal s(t) that is delayed by ti. Once the delay amount Di for the i-th delay circuit (i=1, 2, . . . , M) is determined, the sound signal that is traveled from θ direction is enhanced to be output as an output signal. That is, irrespective of a specific microphone, the sound signal s(t) would be the same except that it is delayed by D0.

As the sound signals s(t) having the corrected phases are added by an adder, the sound waves from θ direction are enhanced according to the number of added signals. On contrary, the sound signals from θn direction other than θ direction are received with delay time Tn that differs from Ti, such that the phases of the sound signals are not equal. Accordingly, the added signals are not enhanced even after being added. Thus, the sound signals only from the target direction θ are enhanced, while suppressing noise from the other direction.

The output signal of the microphone array becomes larger when the target direction θ is directed to a speaker. Based on detection of the direction of the speaker, the sound signals are added while adjusting their phases so as to enhance the sound waves from the target direction θ, that is, the direction of the speaker. In this manner, a directivity of the microphone array is controlled to collect the target sound with high SN ratio. In this example, the microphones may be arranged in various other ways, for example, at non-equal pitch, or in two or three dimensions.

In the first embodiment, the changing of the directivity of the built-in microphone and the manipulations of erecting and housing the camera are performed in interlock with each other. Therefore, it is possible to change the sound collecting directivity optimized to the use scene without user's performing the manipulation for changing the directivity of the microphone built in the body.

The user does not have to be aware of the changing of the directivity of the microphone built in the body, as long as the user draws out the camera or houses the camera. In addition, if the camera is drawn out to be in the photographable state, the microphone is controlled to have the forward directivity irrespective of whether or not the photographing is actually performed. Therefore, even in a case where the video image is temporarily not displayed in the middle of the conference, the microphone directivity is not changed.

In addition, by employing the microphone array technique, it is possible to implement the control of the directivity while maintaining a small size of the apparatus.

<Configuration of Second Embodiment>

Figure 7A:
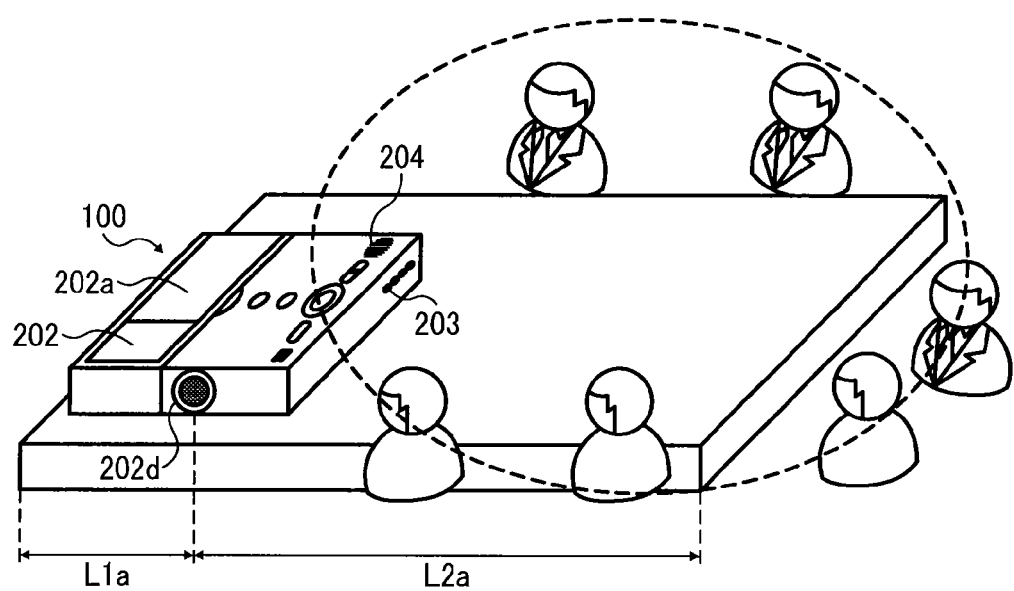
FIGS. 7A and 7B are illustration for explaining operations of a conference apparatus according to a second embodiment of the present invention.

A second embodiment is described with reference to FIGS. 7A and 7B. As illustrated in FIG. 7A, in the second embodiment, in addition to the configuration of the first embodiment, a distance sensor 202d is installed. The distance sensor 202d measures a distance from the edge of the table of the conference apparatus 200. A distance from the front edge of the table is referred to as a forward distance, and a distance from the rear edge is referred to as a backward distance. The distance sensor 202d may be an infrared sensor or an ultrasonic sensor. In this case, the distance sensor 202d functions as a use environment detection unit.

<Operations of Second Embodiment>

For example, as illustrated in FIG. 7A, a backward distance L1a and a forward distance L2a measured by the distance sensor 202d are compared, and in a case where the L2a is equal to or larger than two times the L1a, the microphone 203 is controlled so as to have a forward directivity.

Figure 7B:
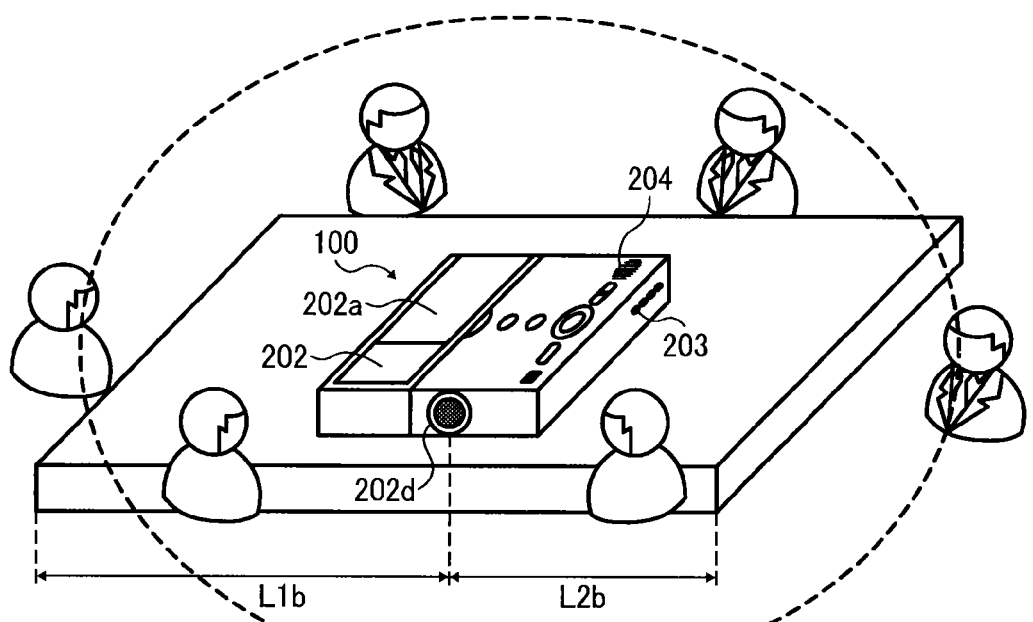

In addition, as illustrated in FIG. 7B, a backward distance L1b and a forward distance L2b measured by the distance sensor 202d are compared, and in a case where the L2b is smaller than half of the L1b, the microphone 203 is controlled so as to have a forward directivity.

In FIGS. 7A and 7B, the camera 202 is housed so as to be in an unphotographable state. However, the directivity of the microphone 203 may be changed according to the comparison result by the distance sensor 202d, irrespective of the state of the camera 202. Alternatively, the state of the camera 202 may be taken into consideration such that, in a case where the camera 202 is drawn out, the directivity of the microphone 203 is controlled according to the state of the camera 202 as described above for the first embodiment.

According to the second embodiment, since the control of the directivity of the microphone is able to be performed according to the position of the conference apparatus 200 installed on the table, it is possible to use the conference apparatus in the state more suitable for the use environment.

<Configuration of Third Embodiment>

Figure 8:
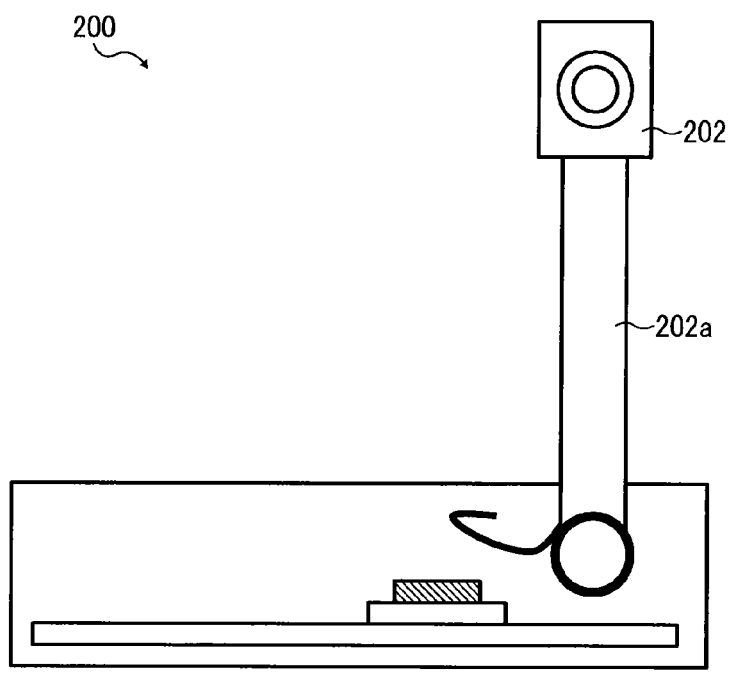
FIG. 8 is a front view illustrating a configuration of the conference apparatus according to the first embodiment of the present invention.

In the first embodiment, the conference apparatus 200 is arranged at the front edge of the table (at the front side as viewed from the participant side), and the control of the directivity of the microphone 203 which collects only the sound of the front side (participant side) of the conference apparatus 200 is described. Namely, as illustrated in FIG. 8, in the embodiment, it is assumed that the camera 202 and the microphone 203 of the conference apparatus 200 are arranged so as to face the participant side which is present at the front side of FIG. 8, and the directivity of the microphone 203 is directed to the participant side. FIG. 8 is a front diagram illustrating a configuration of the conference apparatus according to the first embodiment of the present invention.

Figure 1B:
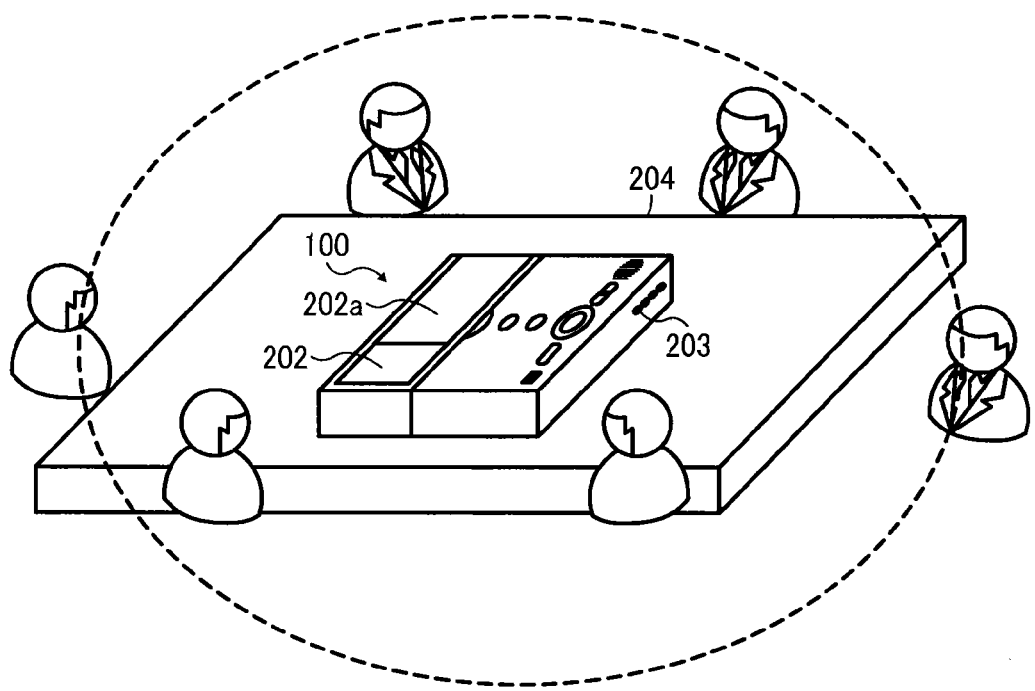
Figure 9:
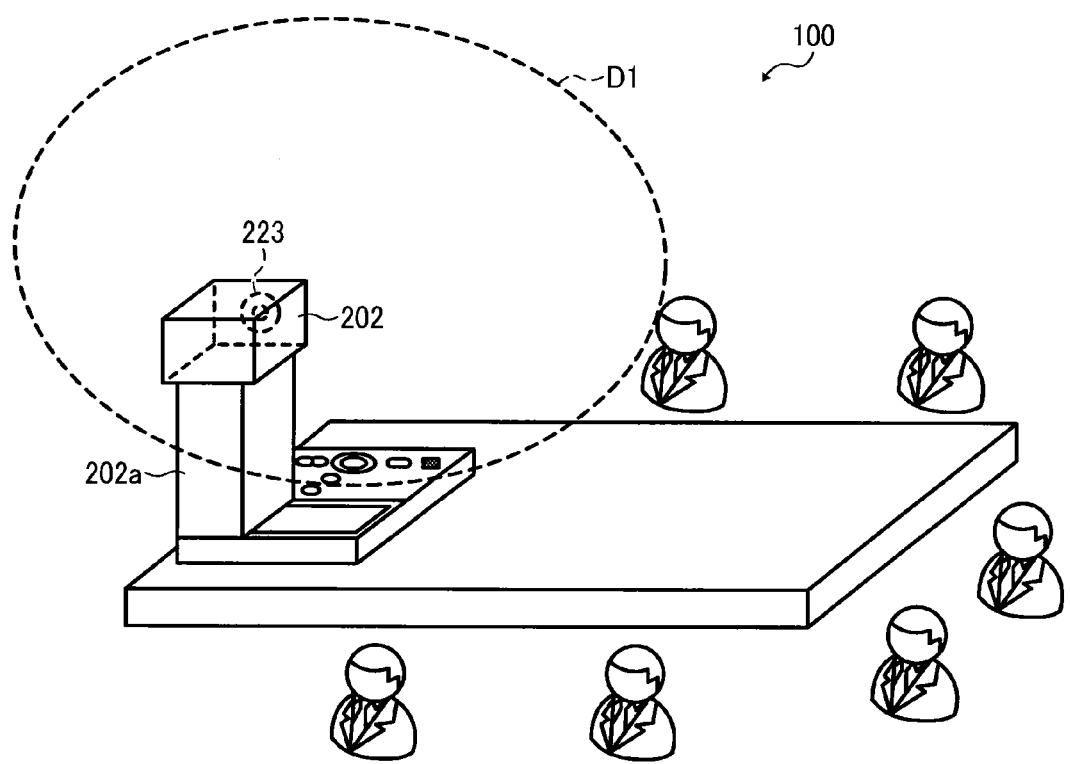
FIG. 9 is a perspective diagram illustrating a configuration and operations of a conference apparatus according to a third embodiment of the present invention.

However, with respect to the actual use scene, in some cases, it is assumed that the conference apparatus 200 is arranged, for example, in the lateral direction, that is, in the state where the conference apparatus is rotated by 90 degrees from the arrangement direction illustrated in FIGS. 1A and 1B counterclockwise as viewed from the top surface of the table. This state is described with reference to FIG. 9. FIG. 9 is a perspective diagram illustrating a configuration and operations of a conference apparatus according to a third embodiment of the present invention.

In the arrangement illustrated in FIG. 9, all the conference participants is not able to be photographed by the camera 202, and similarly to the first embodiment, if the directivity of the microphone 203 is in the same direction as that of the camera 202, the directivity of the microphone 203 is in the direction of D1 in FIG. 9. Therefore, the sound of the participants is not able to be collected. Accordingly, in order to perform the videoconference even in this arrangement, first, it is considered that the camera 202 is used in the state of being dedicated to the participant side. This point is described with reference to FIG. 10.

Figure 10:
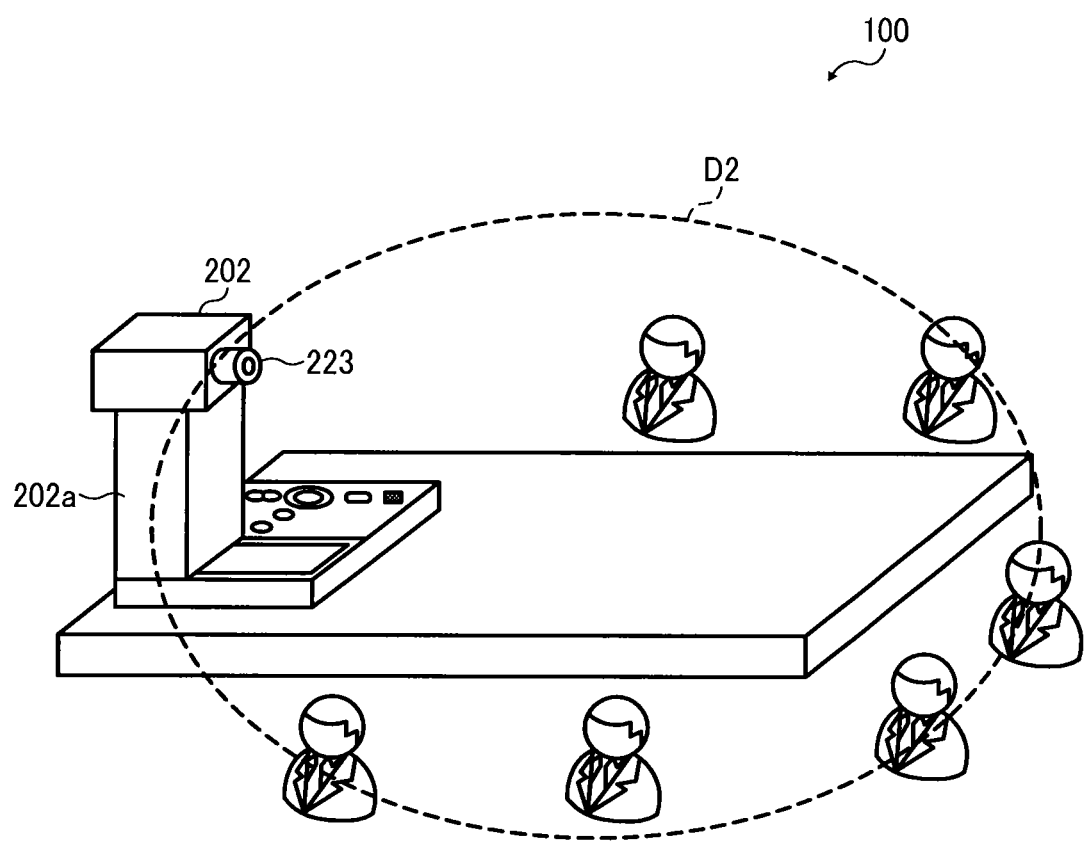
FIG. 10 is a perspective view illustrating a configuration of the conference apparatus according to the third embodiment of the present invention.

FIG. 10 is a perspective diagram illustrating a configuration and operations of the conference apparatus according to the third embodiment of the present invention. As illustrated in FIG. 10, the camera 202 is rotated by 90 degrees with respect to the arm 202a clockwise as viewed from the top surface of the table, so that the camera 202 is in the state of being capable of photographing the entire conference participants.

Next, with respect to the directivity of the microphone 203, in order to collect the sound of the participants, the direction of the camera 202 is sensed, the direction where the camera 202 is to be directed is tracked, so that the directivity is controlled. Next, in a case where the camera 202 is directed to the participant side as illustrated in FIG. 10, the directivity of the microphone 203 is also set to be in the direction of D2 in FIG. 10. This point is described with reference to FIGS. 11A and 11B.

Figure 11B:
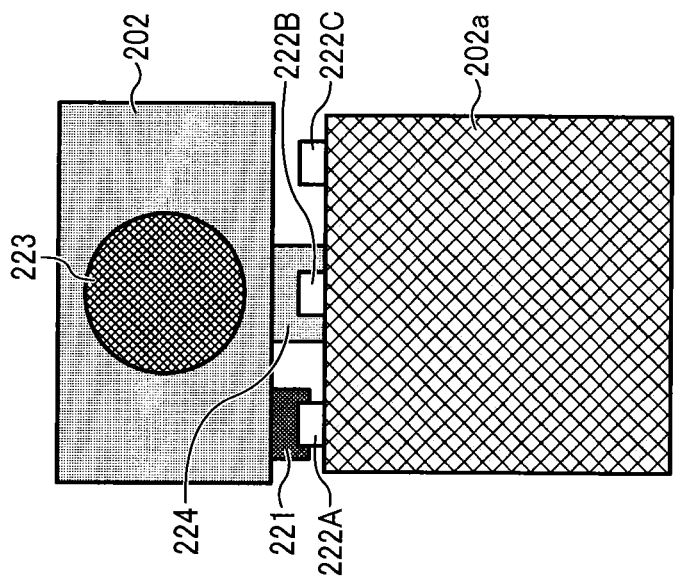
FIGS. 11A and 11B are plan view and front view illustrating a configuration of main components of the conference apparatus according to the third embodiment of the present invention.
Figure 11A:
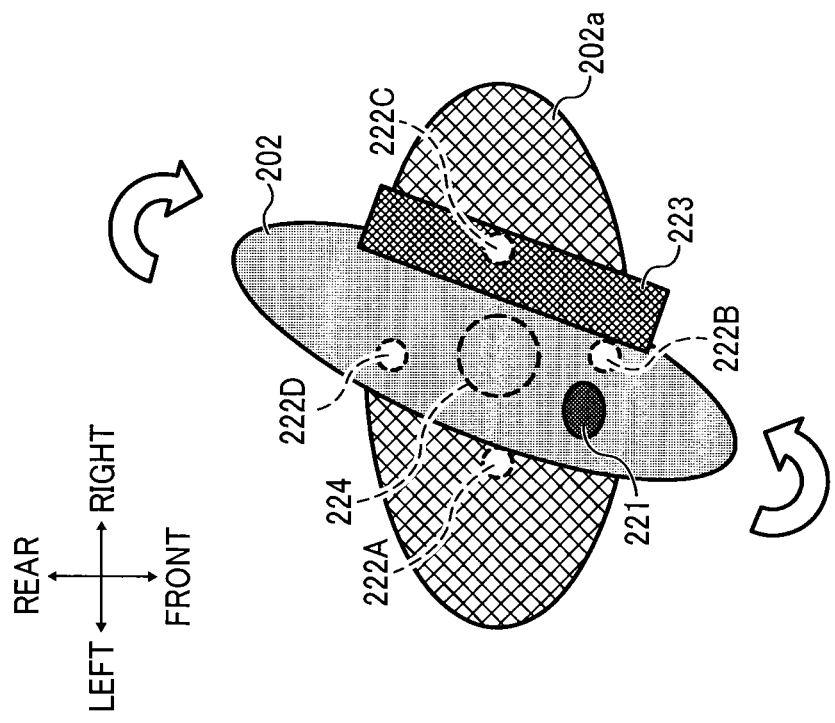

FIGS. 11A and 11B are plan and front diagrams illustrating a configuration of main components of the conference apparatus according to the third embodiment of the present invention. As illustrated in FIG. 11A, the camera 202 is configured so that the arm 202a is rotatable about a rotation axis 224 in the arrow direction. In addition, camera direction detection switches 222A, 222B, 222C, and 222D are installed in the respective forward, backward, leftward, and rightward directions on the plane of the arm 202a facing the bottom of the camera 202.

In addition, a switch pressing-down protrusion 221 which presses down the camera direction detection switches 222A, 222B, 222C, and 222D according to the direction of the camera 202 is installed on the plane of the camera 202 facing the top of the arm 202a. Next, as illustrated in FIG. 11B, in interlock with the rotation of the camera 202 and the pressing down of the switch pressing-down protrusion 221 with respect to the camera direction detection switches 222A, 222B, 222C, and 222D, the direction of the camera 202 is detected, and the directivity of the microphone 203 is changed. Therefore, it is possible to control the directivity of the microphone 203 by tracking the direction where the camera 202 is to directed.

More specifically, as illustrated in FIG. 11A, as viewed from the participant side, a case where the camera 202 is in the direction to face the participants is referred to as "forward (front)", and a case where the camera is in the direction to turn its back on the participants is referred to as "backward (rear)". In addition, as viewed from the participants, a case where the camera 202 is directed to the rightward is referred to as "rightward (right)", and a case where the camera is directed to the leftward is referred to as "leftward (left)". The camera 202 is configured to be rotatable about a rotation axis 224 with respect to the arm 202a.

In addition, the camera direction sensing switches 222A, 222B, 222C, and 222D for detecting the direction of the camera 202 are installed in the respective forward, backward, leftward, and rightward directions on the plane of the arm 202a facing the bottom of the camera 202. At least four camera direction sensing switches may be installed. In order to more accurately detect the rotation direction of the camera 202, four or more camera direction sensing switches may be installed.

In this configuration, if the camera 202 is rotated, one of the camera direction sensing switches 222A, 222B, 222C, and 222D is switched on by the switch pressing-down protrusion 221 installed on the plane of the camera 202 facing the top of the arm 202a. Therefore, it is possible to sense the direction of the camera 202.

A specific example of the case of sensing the four directions of the camera 202 by using the four camera direction sensing switches 222 is described. In a case where the camera direction sensing switch 222A is pressed down, it is determined that the camera 202 is directed forward (to the participant side). In a case where the camera direction sensing switch 222B is pressed down, it is determined that the camera 202 is directed rightward. In a case where the camera direction sensing switch 222C is pressed down, it is determined that the camera 202 is directed backward (turns its back on the participants). In a case where the camera direction sensing switch 222D is pressed down, it is determined that the camera 202 is directed leftward.

In addition, the camera direction sensing switches 222A, 222B, 222C, and 222D may be implemented with an optical sensor, a proximity sensor, or the like besides a general mechanical switch illustrated in FIG. 10.

Next, a specific example of controlling the directivity of the microphone according to the embodiment is described. First, in a case where the conference apparatus 200 is arranged at the front edge of the table (at the front side as viewed from the participant side), an image of the directivity of the microphone 203 is indicated by the broken line in FIG. 1A described above. In this case, the microphone 203 collects the sound of the front side (participant side) of the conference apparatus 200.

Next, in a case where the conference apparatus 200 is arranged in the lateral direction at the front edge of the table, an image of the directivity of the microphone 203 is indicated by the broken line D1 in FIG. 9 described above. At this time, in a case where there is no unit of detecting the direction of the camera 202 described above, the microphone 203 is not able to collect the sound of the participants.

On the contrary, in a case where there is a unit of detecting the direction of the camera 202 as described in the embodiment, the camera is rotated by 90 degrees clockwise as viewed from the top of the table so that a lens 223 of the camera is directed to the participant side as illustrated in FIG. 10. Next, the direction of the camera 202 is sensed, and the directivity of the microphone 203 is changed, so that the directivity of the microphone 203 is able to be controlled to be in the same direction as that of the camera 202.

Namely, four patterns of direction of the camera 202 are sensed by using four camera direction detection switches 222A, 222B, 222C, and 222D, and the directivity of the microphone 203 is set to be in the direction where the camera 202 is directed. When the camera direction sensing switch 222A is pressed down, it is determined that the camera 202 is directed forward (to the participant side), so that the directivity of the microphone 203 is set to be forward directional (to the participant side). When the camera direction sensing switch 222B is pressed down, it is determined that the camera 202 is directed rightward, so that the directivity of the microphone 203 is set to be rightward directional.

When the camera direction sensing switch 222C is pressed down, it is determined that the camera 202 is directed backward (turns its back on the participants), so that the directivity of the microphone 203 is set to be backward directional. When the camera direction sensing switch 222D is pressed down, it is determined that the camera 202 is directed leftward, so that the directivity of the microphone 203 is to be leftward directional.

According to the third embodiment, even in a case where the conference apparatus is arranged in the lateral direction, the directivity of the microphone is able to be appropriately controlled so that the microphone is directed to the participant side.

In addition, the control of the directivity of the microphone 203 is performed by a microphone array technique. The microphone array technique is a technique of estimating sound wave signals at the positions on the same plane by a wave equation of the sound waves having reached a plurality of microphones from a sound source. By using this, sound in a collecting range is able to be enhance, so that it is possible to implement a sound collecting device having a directivity.

For example, the microphone array technique described in Japanese Patent Application Publication No. 2006-332736-A may be applied to control a directivity.

It is assumed that a plurality of microphones are arranged in line to form a microphone array. A plurality of delay circuits that correspond to the microphones are also provided, which delay the sound signals output from the microphones. The sound signals, output from the delay circuits, are added by an adder, to be output.

The delay amount set by the delay circuit is determined such that the sound signals that reach the microphones from a target direction are caused to have the same phase when added by the adder. Accordingly, the sound signals from the target direction are enhanced.

The sound signals traveling from a direction other than the target direction are collected with a delay amount that is different than the delay amount set for the sound signal traveling from the target direction. Since the sound signals do not have the same phase, the sound signals are not enhanced.

Using this technique, a direction of a sound source is detected.

For example, referring to FIG. 2 of Japanese Patent Application Publication No. 2006-332736-A, eight microphones 1-1 to 1-8 are arranged in line. Spot 1 is a main focus point where a sound signal from a sound source is collected. Spot 2 and Spot 3 are provided at left and right of the main point, respectively, such that they are symmetric with respect to a line L1 that connects the center C of the microphone array and Spot 1. That is, an angle of line L2 that connects the center C and Spot 2 is equal to an angle of line L3 that connects the center C and Spot 3.

With this configuration, the sound signal having the sound waves that are enhanced when traveling from the target direction (that is, direction of Spot 1) is referred to as a main signal. The sound signal having the sound waves that are enhanced when traveling from the direction of Spot 2 is referred to as a detection signal Out2. The sound signal having the sound waves that are enhanced when traveling from the direction of Spot 3 is referred to as a detection signal Out 3.

The main signal has a higher level when the sound source is directed to Spot 1. When the sound source moves left or right of Spot 1, the sound signal has a lower level.

The detection signals Out 2 and Out 3 have substantially the same levels when the sound source is directed to Spot 1. When the sound source moves left, the detection signal Out 2 increases and the detection signal Out 3 decreases. When the sound source moves right, the detection signal Out3 increases and the detection signal Out2 decreases. Based on a difference in signal level between the detection signals Out2 and Out 3, the direction of the sound source can be detected.

Once the direction of the sound source is detected, the microphone array can be controlled to have a directivity that corresponds to the detected direction of the sound source, for example, by controlling the direction of the sound signal according to Spot 1, Spot 2, and/or Spot 3.

<Operations of Third Embodiment>

Figure 12:
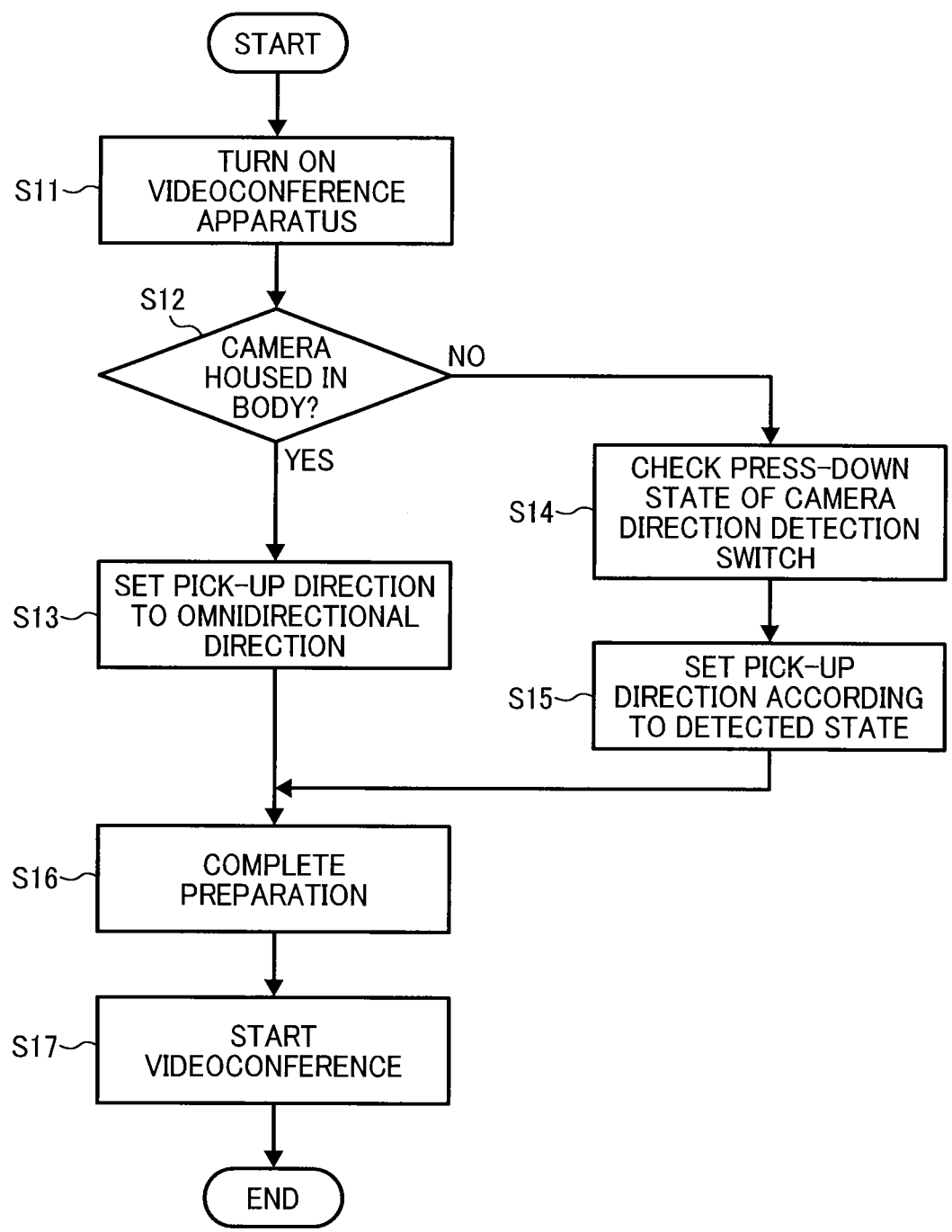
FIG. 12 is a flowchart illustrating operation performed by the conference apparatus according to the third embodiment of the present invention.

Operations of the conference apparatus 200 are described with reference to FIG. 12. FIG. 12 is a flowchart illustrating operations of the conference apparatus according to the third embodiment of the present invention. First, as illustrated in FIG. 12, the camera 202 is powered on (step S11). Next, it is sensed by the camera housing sensor 202c whether or not the camera 202 is housed in the body (step S12).

In a case where it is sensed that the camera 202 is housed in the body (Yes in step S12), the directivity of the microphone 203 is set to be omnidirectional (step S13), so that the microphone is in the state of having an omnidirectional directivity. FIG. 1B illustrates a case where it is assumed that the conference apparatus 200 is installed at the center of the table and conference participants are present so as to surround the conference apparatus 200, and sound in the range surrounded by the broken line is collected. In this case, the sound collecting range is the same as that of a case where the directivity is not controlled.

In a case where it is sensed that the camera 202 is not housed in the body (No in step S12), press-down states of the camera direction detection switches 222A, 222B, 222C, and 222D are checked (step S14). The direction of the camera 202 is detected according to which one of the camera direction detection switches 222A, 222B, 222C, and 222D is pressed down by the switch pressing-down protrusion 221. The directivity of the microphone 203 is controlled according to the detected state of the camera 202 (step S15).

After that, if the setting of the directivity is ended, the preparation of the conference starting is completed (step S16), and the conference is started (step S17).

<Configuration of Fourth Embodiment>

Figure 13:
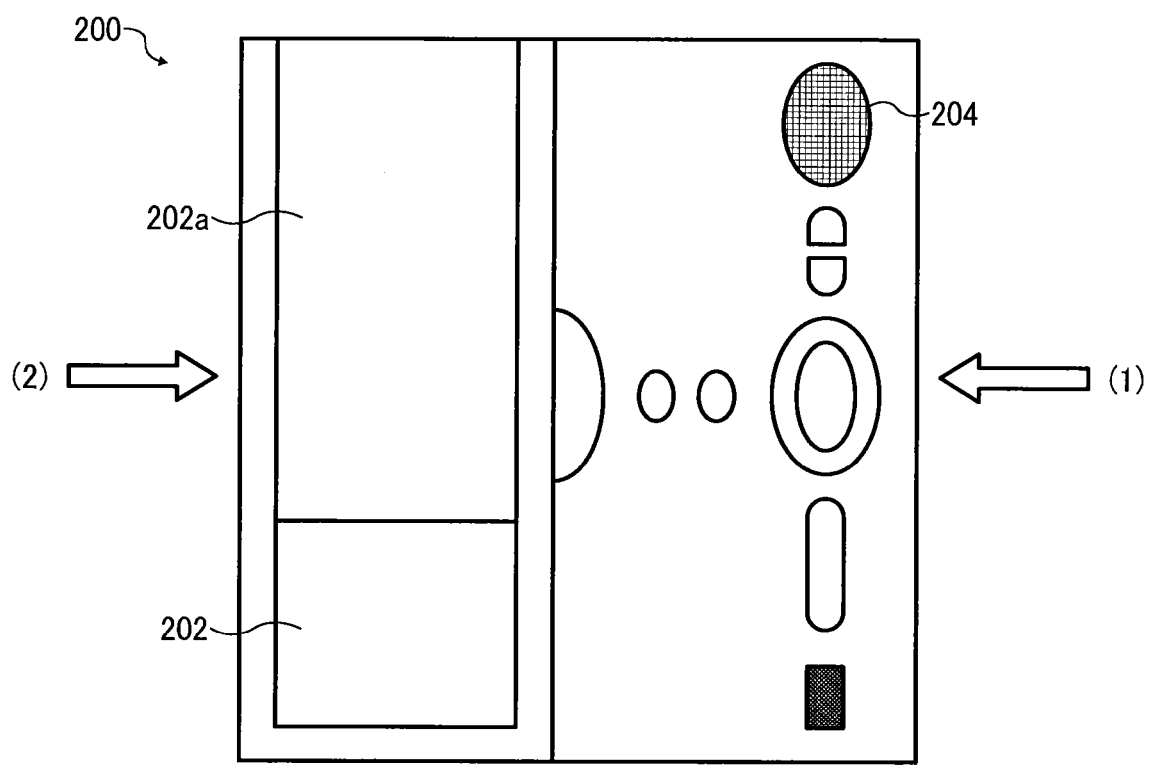
FIG. 13 is a plan diagram illustrating a configuration of a conference apparatus according to a fourth embodiment of the present invention.

In the first embodiment, the control of the directivity of the microphone 203 according to the housed state of the camera 202 is described. Alternatively, a distance from the conference apparatus 200 to a wall of the room may be measured by a distance sensor, it may be estimated which portion of the conference room the conference apparatus 200 is installed in the vicinity of, and the directivity may be controlled according to the result of the estimation. A fourth Embodiment is described with reference to FIG. 13. FIG. 13 is a plan diagram illustrating a configuration of a conference apparatus according to the fourth embodiment of the present invention In the embodiment, a function of estimating the installation position of the conference apparatus by using the distance sensor is described. The distance sensors for measuring the distance from the conference apparatus 200 to the wall of the conference room are installed at the front side (participant side) and the rear side (the opposite side of the participant side) of the body of the conference apparatus 200. It is estimated based on the distances to the wall the conference room measured by the two distance sensors which portion of the conference room the body of the conference apparatus 200 is arranged in the vicinity of.

In FIG. 13, (1) indicates the direction which is sensed by the forward distance sensor of measuring the distance from the wall of the conference room of the front side (the participant side) of the conference apparatus 200 to the conference apparatus 200. (2) indicates the direction which is sensed by the backward distance sensor of measuring the distance from the wall of the conference room of the rear side (the opposite side of the participant side) of the conference apparatus 200 to the conference apparatus 200.

The estimation as to which portion of the conference room the body of the conference apparatus 200 is arranged in the vicinity of is performed based on the distances measured by the distance sensors, for example, by a method using an ultrasonic wave. This is a method using an ultrasonic distance meter of measuring the distance by using the ultrasonic wave such as a sound wave or an elastic wave having a frequency which is not heard by human ears. An ultrasonic sensor transmits the ultrasonic wave toward an object to be measured, and the ultrasonic wave reflected on the object to be measured is received by the ultrasonic sensor, so that the above-described method is able to be implemented by a method of obtaining the distance between the ultrasonic sensor and the object to be measured from a phase at the time of reception.

According to the method, the ultrasonic wave is transmitted to the wall of the conference room which is an object to be measured, and the ultrasonic wave reflected on the wall is received, so that the distance to the wall is able to be calculated based on the phase and time delay of the received ultrasonic wave. Next, the directivity of the microphone 203 is controlled according to the estimation result of the distance from the body of the conference apparatus 200 to the wall of the conference room.

For example, in a case where the distance to the wall in the backward direction (2) is short and the distance to the wall in the forward direction (1) is long, the conference apparatus 200 is estimated to be arranged at the front side of the table (at the position far from the participants), so that the directivity is set to be suitable for collecting the sound only in the forward direction (to the participant side). On the other hand, in a case where the distance to the wall in the backward direction (2) and the distance to the wall in the forward direction (1) are substantially equal to each other, the conference apparatus 200 is estimated to be arranged in the vicinity of the center of the table, so that the directivity is set to be not controlled (set to be in a sound collecting range with no directivity). In addition, the sensor of measuring the distance may be implemented by an infrared sensor besides the above-described ultrasonic sensor. In the case of using the infrared sensor, a passive distance measuring sensor and an active reflective distance measuring sensor may be used separately according to the distance which is to be measured.

Figure 14:
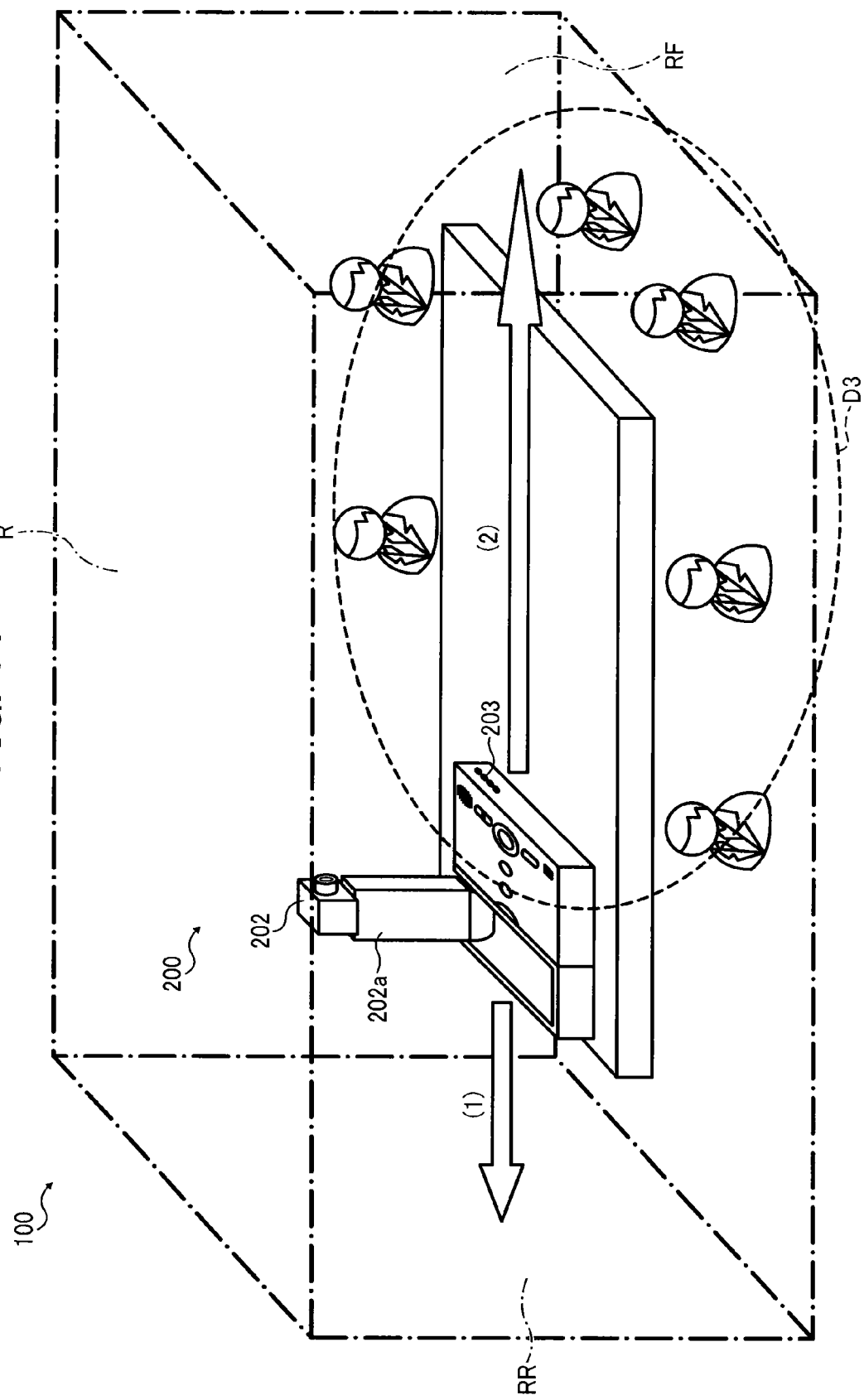
FIG. 14 is an illustration for explaining operations of the conference apparatus according to the fourth embodiment of the present invention.
Figure 15:
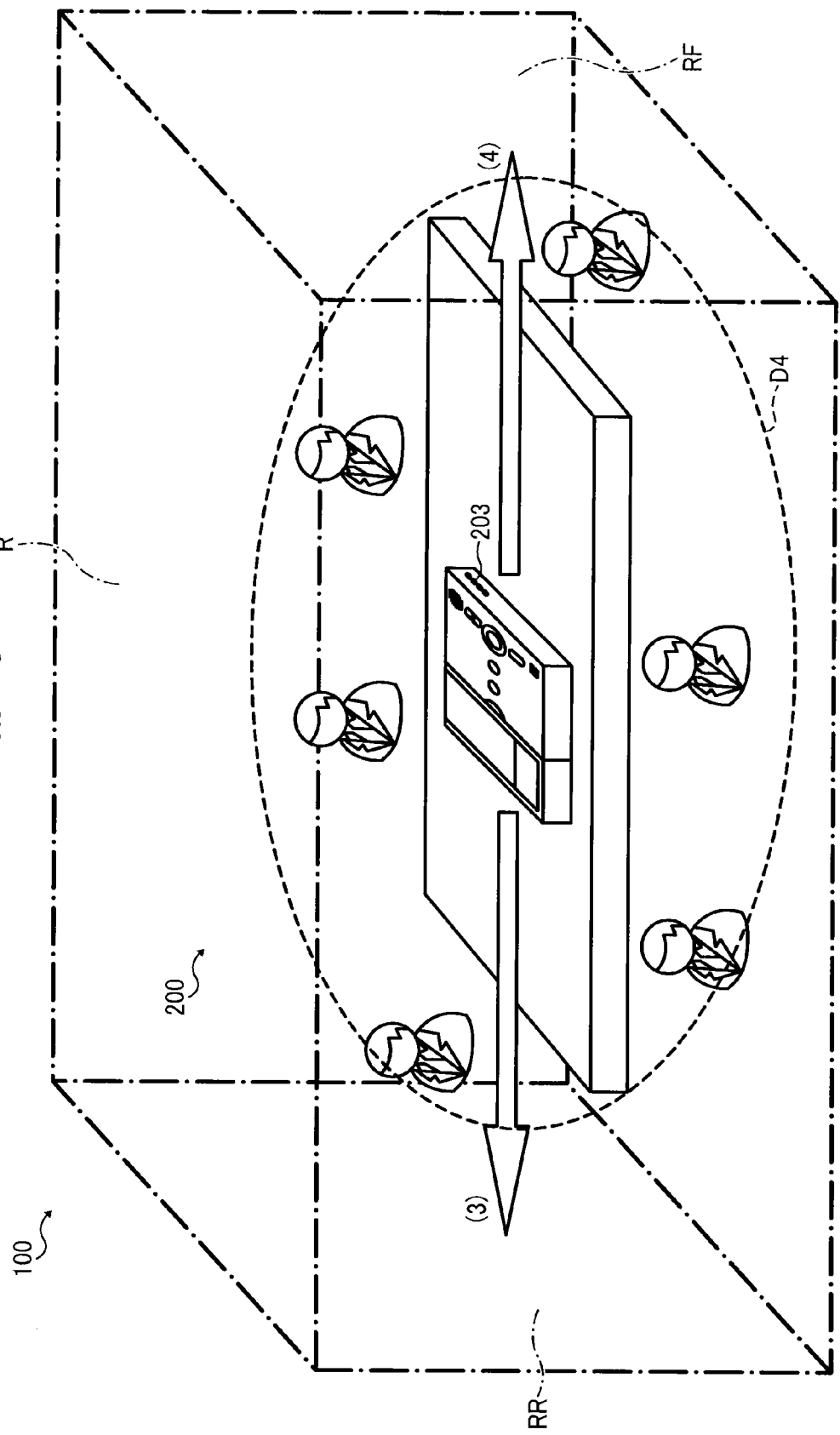
FIG. 15 is an illustration for explaining operations of the conference apparatus according to the fourth embodiment of the present invention.

Next, the control of the directivity of the microphone using the distance sensor according to the embodiment is described. FIGS. 14 and 15 are perspective diagrams illustrating a configuration and operations of the conference apparatus according to the fourth embodiment of the present invention. FIG. 14 illustrates an image of the directivity D3 of the microphone 203 in a case where the conference apparatus 200 is arranged at the front edge (the opposite side of the participant side) of the table of the conference room R. In this case, the distance (1) from the conference apparatus 200 to the rear wall RR is short, and the distance (2) from the conference apparatus 200 to the front wall RF is long.

On the contrary, FIG. 15 illustrates the image of the directivity D4 of the microphone 203 in a case where the conference apparatus 200 is arranged in the vicinity of the center of the table of the conference room R. In this case, the camera 202 is housed in the body. In addition, the distance (3) from the conference apparatus 200 to the rear wall RR and the distance from the conference apparatus 200 to the front wall RF are substantially equal to each other.

According to the fourth embodiment, as illustrated in FIG. 14, in a case where the distance to the rear wall RR is short and the distance to the front wall RF is long, the conference apparatus 200 is estimated to be arranged at the front edge (the opposite side of the participant side) of the table of the conference room R. Therefore, the directivity of the microphone 203 is set to be suitable for collecting the sound only in the forward direction (to the participant side) of the conference apparatus 200. Accordingly, since the collecting of unnecessary sound (noise) in the backward direction of the conference apparatus 200 is suppressed, it is possible to more clearly collect sound.

In addition, as illustrated in FIG. 15, in a case where the distance to the rear wall RR and the distance to the front wall RF are substantially equal to each other, the conference apparatus 200 is estimated to be arranged in the vicinity of the center of the table of the conference room R. Therefore, the directivity is set to be suitable (omnidirectional) for collecting the sound in all the directions with the microphone 203 and the speaker 204 being centered. Accordingly, since a difference of sound intensities caused by a difference of the distances from the microphone to the participants is decreased, more comfortable conversation is available.

<Operation of Fourth Embodiment>

Figure 16:
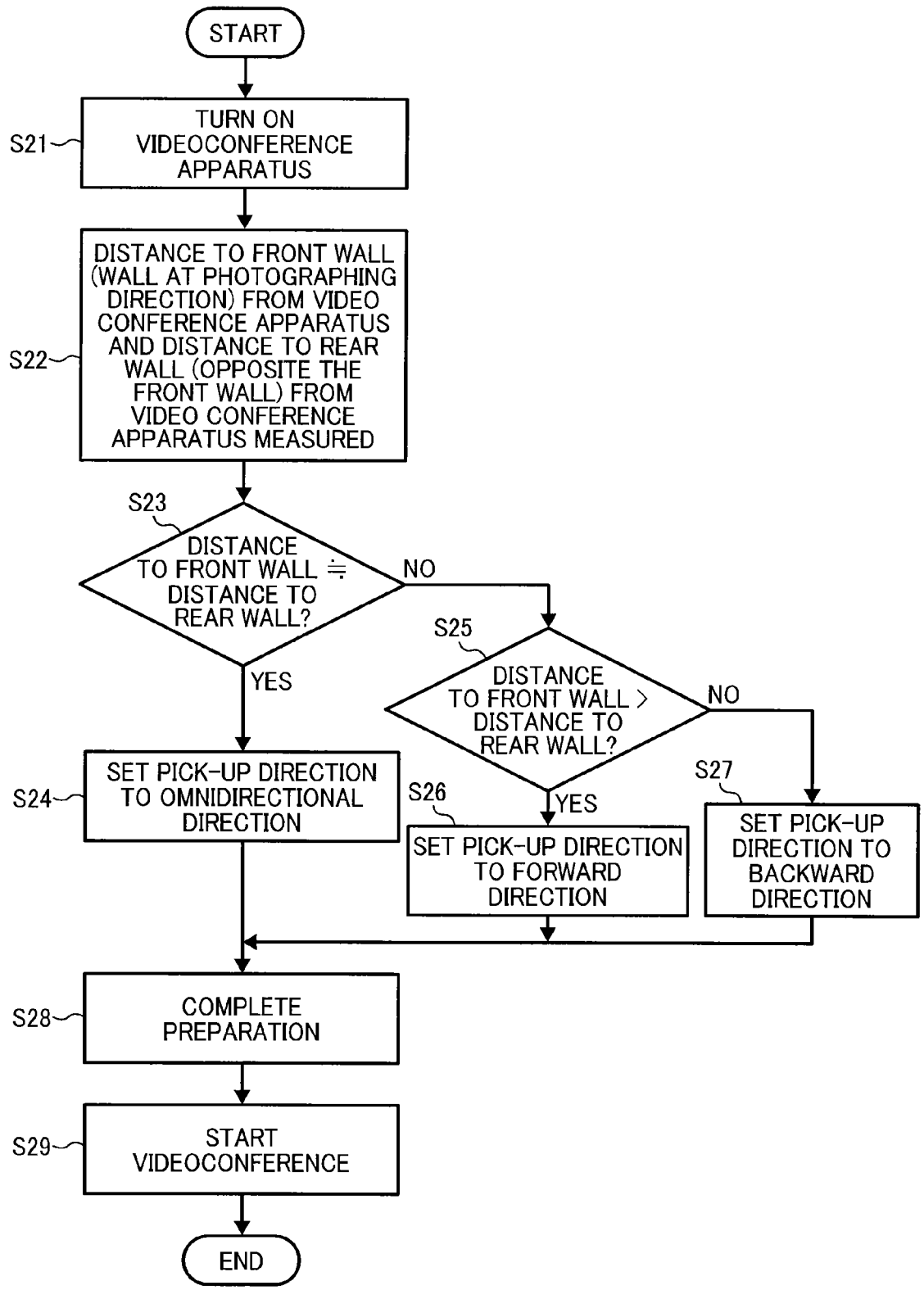
FIG. 16 is a flowchart illustrating operation performed by the conference apparatus according to the fourth embodiment of the present invention.

Operations of the conference apparatus 200 are described with reference to FIG. 16. FIG. 16 is a flowchart illustrating operations of the conference apparatus according to the fourth embodiment of the present invention. First, as illustrated in FIG. 16, the camera 202 is powered on (step S21). Next, a distance from the position where the conference apparatus 200 is arranged to the front wall RF of the conference room R and a distance from the position to the rear wall RR are measured (step S22). Next, it is determined whether the distance to the front wall and the distance to the rear wall are equal to each other (step S23).

In a case where it is determined that the distance to the front wall and the distance to the rear wall are approximately equal to each other (Yes in step S23), the directivity of the microphone 203 is set to be omnidirectional (step S24), so that the microphone 203 is in the state of having an omnidirectional directivity. FIG. 15 illustrates a case where it is assumed that the conference apparatus 200 is arranged at the substantially center of the table of the conference room R and conference participants are present so as to surround the conference apparatus 200, and the sound in the range surrounded by a broken line D4 is collected. In this case, the sound collecting range is the same as that of a case where the directivity is not controlled.

In a case where it is determined that the distance to the front wall and the distance to the rear wall are not equal to each other (No in step S23), it is determined whether or not the distance to the front wall is larger than the distance to the rear wall (step S25). In a case where it is determined that the distance to the front wall is larger than the distance to the rear wall (Yes in step S25), the directivity of the microphone 203 is set to be a forward directivity (step S26). FIG. 14 illustrates a case where the directivity of the microphone 203 is set to the forward directivity suitable for collecting sound in the forward direction. In this case, it is assumed that the conference apparatus 200 is arranged at the front edge of the table and conference participants are present in front of the conference apparatus 200, and sound in the range surrounded by a broken line D3 is collected.

In a case where it is determined that the distance to the front wall is not longer than the distance to the rear wall (No in step S25), the directivity of the microphone 203 is set to the backward directivity (step S27). In this case, it is assumed that the conference apparatus 200 is arranged at the rear edge of the table and the conference participants are present at the back side of the conference apparatus 200. After that, if the setting of the directivity is ended, the preparation of the conference starting is completed (step S28), and the conference is started (step S29).

The above-described embodiments are very exemplary embodiments of the present invention, and the present invention is not limited to the above-described embodiments. Various modifications of the embodiments are available within the scope of the invention without departing from the spirit of the invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A conference apparatus comprising:
a capturing unit to capture an image;
a use environment detection unit to detect a use environment in which the conference apparatus is used; and
a sound collecting unit whose directivity are changed according to the use environment detected by the use environment detection unit,
wherein the use environment detection unit detects a state of the capturing unit, which is switched between a capturing state where capturing can be performed and a non-capturing state where capturing cannot be performed.

2. The conference apparatus according to claim 1, wherein, when the use environment detected by the use environment detection unit indicates that the capturing unit is in the capturing state, the sound collecting unit is caused to have directivity having a direction that is the same as a direction where the capturing unit is directed.

3. The conference apparatus according to claim 2, wherein, when the use environment detected by the use environment detection unit indicates that the capturing unit is in the non-capturing state, the sound collecting unit is caused to have directivity that is omnidirectional.

4. The conference apparatus according to claim 3,
wherein the capturing unit includes an arm installed in a body of the conference apparatus, and a camera installed in a distal end of the arm,
when the arm is erected, the capturing unit is in the capturing state, and
when the arm is folded, the capturing unit is in the non-capturing state.

5. The conference apparatus of claim 4,
wherein the use environment detection unit includes a camera housing sensor, which is pressed as the arm is folded.

6. A conference apparatus comprising:
a capturing unit to capture an image;
a use environment detection unit to detect a use environment in which the conference apparatus is used; and
a sound collecting unit whose directivity are changed according to the use environment detected by the use environment detection unit,
wherein the use environment detection unit further detects:
a forward distance which is a distance from a body of the conference apparatus to an edge of an installation plane where the conference apparatus is installed in a direction where the capturing unit is directed; and
a backward distance which is a distance from the body of the conference apparatus to the edge of the installation plane in a direction opposite to the direction where the capturing unit is directed.

7. The conference apparatus according to claim 6, wherein, when the forward distance is equal to or larger than two times the backward distance, the sound collecting unit is caused to have directivity having a direction that is the same as the direction where the capturing unit is directed.

8. The conference apparatus according to claim 6, wherein, when the forward distance is smaller than half of the backward distance, the sound collecting unit is caused to have directivity that is omnidirectional.

9. The conference apparatus according to claim 6, wherein the use environment detection unit includes a distance sensor that measures the forward distance and the backward distance.

10. The conference apparatus according to claim 1, wherein the sound collecting unit includes a microphone array.

11. A conference apparatus comprising:
a camera to capture an image;
circuitry configured to detect a use environment in which the conference apparatus is used; and
a microphone whose directivity is changed according to the use environment detected by the circuitry configured to detect,
wherein the circuitry configured to detect detects a state of the camera, which is switched between a capturing state where capturing can be performed and a non-capturing state where capturing cannot be performed.

12. The conference apparatus according to claim 11, wherein, when the use environment detected by the circuitry configured to detect indicates that the camera is in the capturing state, the microphone is caused to have directivity having a direction that is the same as a direction where the camera is directed.

13. The conference apparatus according to claim 12, wherein, when the use environment detected by the circuitry configured to detect indicates that the camera is in the non-capturing state, the microphone is caused to have directivity that is omnidirectional.

14. The conference apparatus according to claim 13,
wherein the camera includes an arm installed in a body of the conference apparatus, and an image capture device installed in a distal end of the arm,
when the arm is erected, the image capture device is in the capturing state, and
when the arm is folded, the image capture device is in the non-capturing state.

15. The conference apparatus of claim 14,
wherein the circuitry configured to detect includes a camera housing sensor, which is pressed as the arm is folded.

16. The conference apparatus according to claim 11, wherein the circuitry configured to detect further detects:
a forward distance which is a distance from a body of the conference apparatus to an edge of an installation plane where the conference apparatus is installed in a direction where the camera is directed; and
a backward distance which is a distance from the body of the conference apparatus to the edge of the installation plane in a direction opposite to the direction where the camera is directed.

17. The conference apparatus according to claim 16, wherein, when the forward distance is equal to or larger than two times the backward distance, the microphone is caused to have directivity having a direction that is the same as the direction where the camera is directed.

18. The conference apparatus according to claim 16, wherein, when the forward distance is smaller than half of the backward distance, the microphone is caused to have directivity that is omnidirectional.

19. The conference apparatus according to claim 16, wherein the circuitry configured to detect includes a distance sensor that measures the forward distance and the backward distance.

20. The conference apparatus according to claim 11, wherein the microphone includes a microphone array.

* * * * *